United States Patent [19]

Todd

[11] 4,292,539
[45] Sep. 29, 1981

[54] COMPENSATED COUNT-RATE CIRCUIT FOR RADIATION SURVEY METER

[75] Inventor: Richard A. Todd, Powell, Tenn.

[73] Assignee: The United States of America as represented by the United States Department of Energy, Washington, D.C.

[21] Appl. No.: 148,862

[22] Filed: May 12, 1980

[51] Int. Cl.$^3$ .............................................. G01T 1/18
[52] U.S. Cl. ..................................... 250/374; 250/388
[58] Field of Search ........................ 250/374, 375, 388

[56] References Cited

U.S. PATENT DOCUMENTS

| 3,366,791 | 1/1968 | Markow | 250/388 |
| 3,576,440 | 4/1971 | Jehle et al. | 250/388 |
| 3,576,995 | 5/1971 | Nirschl et al. | 250/388 |

Primary Examiner—Davis L. Willis
Attorney, Agent, or Firm—David E. Breeden; Stephen D. Hamel; Richard G. Besha

[57] ABSTRACT

A count-rate compensating circuit is provided which may be used in a portable Geiger-Mueller (G-M) survey meter to ideally compensate for counting loss errors in the G-M tube detector. In a G-M survey meter, wherein the pulse rate from the G-M tube is converted into a pulse rate current applied to a current meter calibrated to indicate dose rate, the compensated circuit generates and controls a reference voltage in response to the rate of pulses from the detector. This reference voltage is gated to the current-generating circuit at a rate identical to the rate of pulses coming from the detector so that the current flowing through the meter is varied in accordance with both the frequency and amplitude of the reference voltage pulses applied thereto so that the count rate is compensated ideally to indicate a true count rate within 1% up to a 50% duty cycle for the detector. A positive feedback circuit is used to control the reference voltage so that the meter output tracks true count rate indicative of the radiation dose rate.

6 Claims, 4 Drawing Figures

COMPENSATED COUNT-RATE CIRCUIT FOR RADIATION SURVEY METER

BACKGROUND OF THE INVENTION

This invention relates generally to radiation survey meters and more specifically to a count-rate circuit for use in a radiation survey meter that compensates for counting losses due to detector dead time. This invention is a result of a contract with the U.S. Department of Energy.

In the art of radiation surveying, a Geiger-Mueller (G-M) tube is often employed as a detecting element for detection and measurement of various types of environmental nuclear radiation. G-M counters are extremely sensitive, rugged, versatile and stable. They may be used to measure alpha, beta, or gamma radiation. They are relatively insensitive to small fluctuations in the high-voltage supply necessary for their operation. However, at high counting rates large counting losses are observed in survey instruments using G-M tubes. This counting loss is due to dead time phenomenon associated with the G-M detector and the system electronics. For random inputs, the actual count per unit time (N) is related to the observed count per unit time (n) by the relation $$N = \frac{n}{1 - nt_d}, \qquad (1)$$

where $t_d$ is the dead-time of the system and $nt_d$ is always less than or equal to 1. If the resolving time of the system electronics is less than the dead time of the detector, the system dead time is very nearly the dead time of the detector. This phenomenon is usually referred to as the counting loss or dead time loss and results from the fact that the G-M tube, upon initiation of the Townsend avalanche by a primary ionizing event, remains insensitive to new events for an appreciable period of time $t_d$. This dead time may range from 10 to 500 microseconds depending upon the size of the tube, the gas in the tube, and other factors. For the larger, more sensitive tubes used in survey instruments, the dead time may be typically of the order of 50 to 150 microseconds and is ordinarily much longer than the time required by the pulse circuitry of the dose rate meter to properly process the detector pulses.

The true counting rate (N) which would be obtained with an ideal detector ($t_d = 0$) is impossible to obtain with a G-M tube. Various attempts have been made in the design of processing circuits to deal with the dead time loss of a G-M detector. If $nt_d$ is considerably less than 1, N can be approximated as $$N \simeq n(1 + nt_d), \qquad (2)$$

but when $nt_d$ becomes comparable to 1, significant errors occur in this approximation.

A basic G-M survey meter design includes a regulated high voltage supply that supplies the bias voltage for the G-M tube, an amplifier, a discriminator, and a one-shot circuit that provides a fixed-width pulse to a pulsed transistor current source. This basic pulse-rate measuring circuit provides a quantum of charge $\Delta Q$ at its output for every input pulse. The average meter current ($\overline{I_m}$) produced by the pulsed transistor current source, shown in FIG. 1 of the drawings, is given by $$\overline{I_m} = n\Delta Q = nT_1 \frac{(V_p - V_{BE})}{R_E} \qquad (3)$$

where $T_1$ is the width of the fixed-width pulse from the one-shot circuit. Assuming that the resolving time of the circuit of FIG. 1 is less than the dead time of the tube, and the counting rate n is 1000 pulses/sec with a tube dead time ($t_d$) of 100 microseconds, the instrument is in error by a factor of $nt_d = 10^3 \times 10^{-4} = 0.1$ or 10%.

This counting loss error produces a non-linear response as a function of the particle or photon flux incident on the G-M tube. The counting error increases dramatically towards the high end of the counting range of the tube.

In the art, one attempt to compensate the output of a G-M tube to provide a more linear response has been to add a pulse clipper circuit between the output of the one-shot and the meter circuit shown in FIG. 1. A resistance divider circuit supplies a reference voltage for the diode clipper and partially compensates for counting losses, since the current supplied through a resistor in the input circuit and the diode will increase the reference voltage as the count rate increases. At 0 count rate the reference voltage is blocked from the base of the switching transistor in the metering circuit, thereby indicating 0 counts.

The response of this partially compensated circuit is shown by the dashed line in the graph of FIG. 3 where the case for the full-scale counting loss equals 50%. This circuit when calibrated at three-fourths of full scale still produces an approximately 8% high reading at midscale and an 8% low reading at full scale. This type of compensation closely follows equation (2).

Another circuit for compensating the count rate in a survey meter is disclosed in U.S. Patent Application Ser. No. 3,576,995 issued May 4, 1971 to Joseph C. Nirschl et al for a "Radiation Survey Meter Counting Loss Compensation Circuit." In this metering circuit an operational amplifier is used to convert the pulses from the detector into a current which is supplied to a meter M. The counting loss error of the detector, which causes a reduction in meter current from its ideal value at high-dose rate levels, is compensated by means of a Zener diode connected in series with a resistive network in the output circuit of the operational amplifier. When the output voltage of the operational amplifier exceeds the voltage at which the Zener diode starts conducting, the current through the meter is increased to compensate the current in accordance with a loss in count rate at high counting rates. In this circuit the current meter is placed in series with a calibrating resistor, and the Zener diode-resistor network is placed in shunt with the meter calibration resistance. When the output voltage of the operational amplifier exceeds the Zener breakdown voltage, current will flow through both the meter calibration resistance and the Zener diode-resistor network, thus the resulting impedance in series with the meter is reduced at high count rates and the meter current is increased. The Zener diode must be carefully selected for a predetermined breakdown voltage and the resistance in series with the diode must be carefully set in order to obtain a close approximation of the meter current for high-count rates involving counting losses. However, at best this circuit cannot exactly compensate for the dead time of the detector at high radiation count rates.

The compensation which may be obtained by the circuit in the reference patent is limited due to the inherent inaccuracy of matching a curve by generating two straight line segments. This method is adequate for counting losses below 20%, but the use of this circuit at higher counting losses will result in decreased accuracy or will require additional carefully selected Zener-resistor networks. Also, consistent calibration from unit to unit will require tight tolerances on the Zener breakdown voltage.

Thus, there is a need for a compensated count-rate circuit for use with a radiation survey meter which compensates ideally for counting losses due to the dead time of the radiation detector used in the survey meter.

SUMMARY OF THE INVENTION

In view of the above need it is an object of this invention to provide a count rate circuit that compensates ideally for counting losses due to detector dead time in a radiation survey meter.

Another object of this invention is to provide a count rate compensation circuit as in the above object wherein the circuit transfer function is analogous to the counting loss equation (1).

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention, as embodied and broadly described herein, the count-rate compensating circuit of this invention in combination with a radiation survey meter including an ionizing radiation detector which exhibits counting losses due to detector dead time may comprise means for generating a reference voltage that varies as a function of the rate of pulses from the detector which is used to vary the current generated and supplied to a current meter which indicates the dose rate according to the current passing through the meter. A current-generating means is provided to generate the meter current proportional to the rate and amplitude of preselected fixed-width pulses applied to the input thereof. A gating means, responsive to the pulse rate from the detector circuit, gates the reference voltage to the current-generating means for the duration of each of the fixed width pulses from the detector circuit so that the meter current generated by the current generating means is compensated for counting losses due to the known detector dead time. Through positive feedback control of the generated reference voltage, the current flowing through the current meter compensates ideally for counting losses due to the detector dead time.

BRIEF DESCRIPTION OF THE DRAWINGS

The accompanying drawings, which are incorporated in and form a part of this specification illustrate one embodiment of the present invention and, together with the description, serve to explain the principals of the invention. In the drawings.

DETAILED DESCRIPTION

Figure 1:
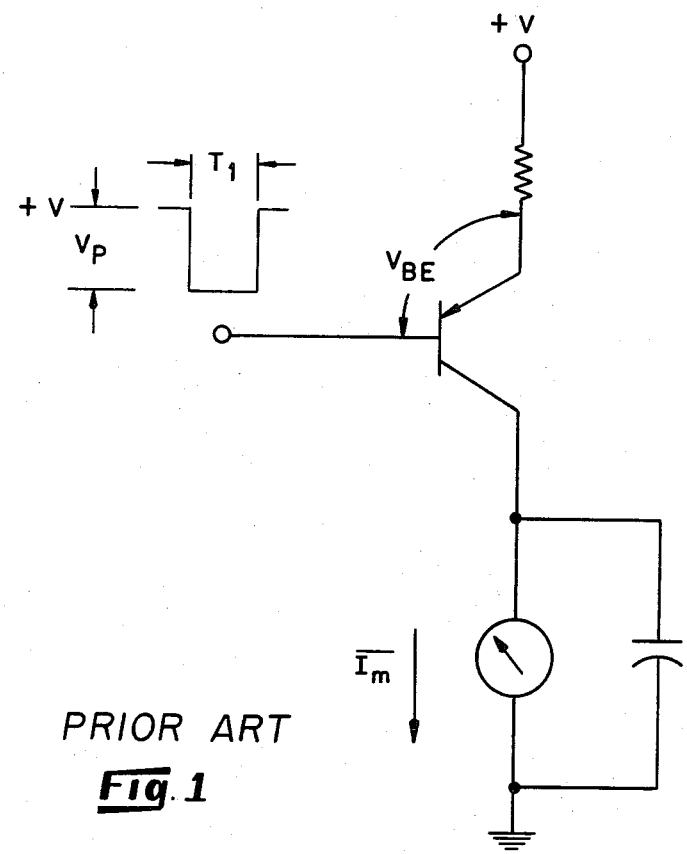
FIG. 1 is a schematic circuit diagram of a pulsed transistor current source normally used as the current generator for generating the meter current in response to pulses from a radiation-survey detecting element.
Figure 2:
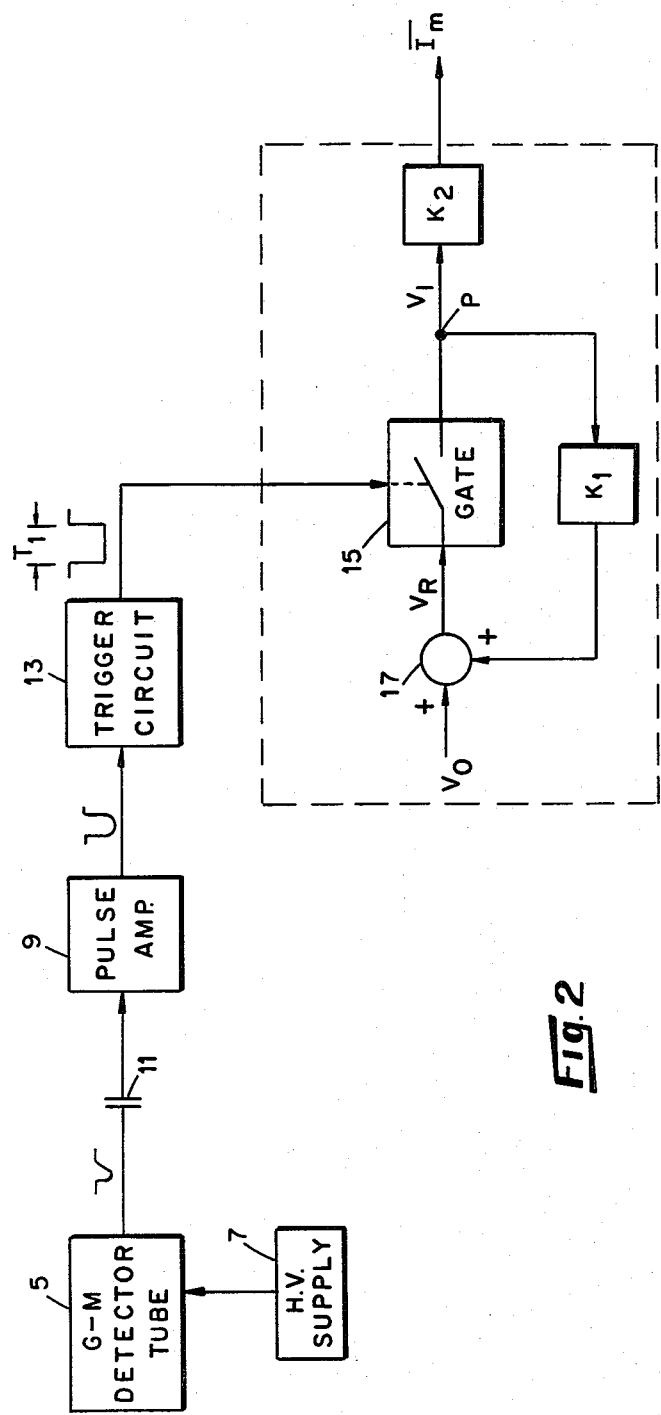
FIG. 2 is a block diagram representation of a G-M survey meter incorporating the count-rate compensating circuit of the present invention.

In the basic radiation survey meter, as shown outside of the dashed lines in FIG. 2, the detector 5 is a G-M tube whose anode is maintained at a high DC voltage by a regulated power supply 7. The output pulses from the detector 5 are coupled to a pulse amplifier 9 through a coupling capacitor 11 and, following amplification, are fed to a trigger circuit 13, such as a one-shot, which generates a fixed-width pulse for each output pulse from the detector. The fixed-width pulses are fed to a pulsed transistor circuit including a current meter as shown in FIG. 1.

This basic circuit has satisfactory accuracy at low count rates but is grossly inaccurate if used at higher count rates due to counting losses associated with the dead time of the detector 5. For a detector with a dead time ($t_d$) of 100 microseconds the counting losses may exceed 50% at count rates (n) above 5000 counts/sec.

In accordance with the invention a count rate compensation circuit as illustrated within the dashed lines of FIG. 2 may be employed to ideally compensate for the counting loss as defined in equation (1) above. The circuit is based on the transfer function of equation (1) and will produce an output current $\overline{I_m}$ proportional to the true count rate N when the dead time of the detector is known and is greater than the resolving time of the circuit.

The input signal to the compensation circuit is the fixed-width pulses from the trigger circuit 13. The width of these pulses ($T_1$) is used to control a gate 15 (shown as a switch). When the incoming pulse is low, a DC reference voltage $V_R$ is gated to an output circuit $K_2$ and results in a voltage pulse $V_1$ at point P that has a width the same as the width of the incoming pulse, and an amplitude equal to the amplitude of the reference voltage $V_R$.

As the count rate of the incoming pulses increases, the signal at point P is fed back to a voltage summing circuit 17 through a positive feedback loop that contains the block labeled $K_1$. The purpose of $K_1$ is to produce a voltage which, together with a fixed voltage $V_o$, is summed to make up $V_R$. $V_o$ is the DC voltage $V_R$ at 0-count rate, i.e., when there are no incoming pulses. There is some integration built into the feedback loop so that its high frequency cutoff is much lower than $1/T_1$. This implies that the reference voltage $V_R$ will not change significantly during the time each individual pulse activates gate 15.

As the voltage pulse $V_1$ passes through the block $K_2$, $V_1$ is converted to the final pulsed output current of the circuit, $\overline{I_m}$. This output current can be expressed in terms of the circuit components and is given as:

$$\overline{I_m} = \frac{n(K_2 T_1 V_o)}{1 - n(K_1 T_1)}. \tag{4}$$

where $K_2$, $T_1$, $V_o$ and $K_1$ are constants. This equation expresses the circuit output current $I_m$ as being equal to the observed counts times a constant divided by 1 minus the observed counts times another constant. The form of this equation is exactly analogous to the counting loss equation (1). It is only necessary to set the positive feedback factor $K_1$ times the trigger circuit pulse width $T_1$ equal to the detector dead time $t_d$, namely $t_d = K_1 T_1$, and to adjust $K_2$ for the proper gain to obtain the desired terms in the $I_m$ equation. When these two conditions are met, the meter current is directly proportional to the actual count rate N; it is not an approximation.

Figure 3:
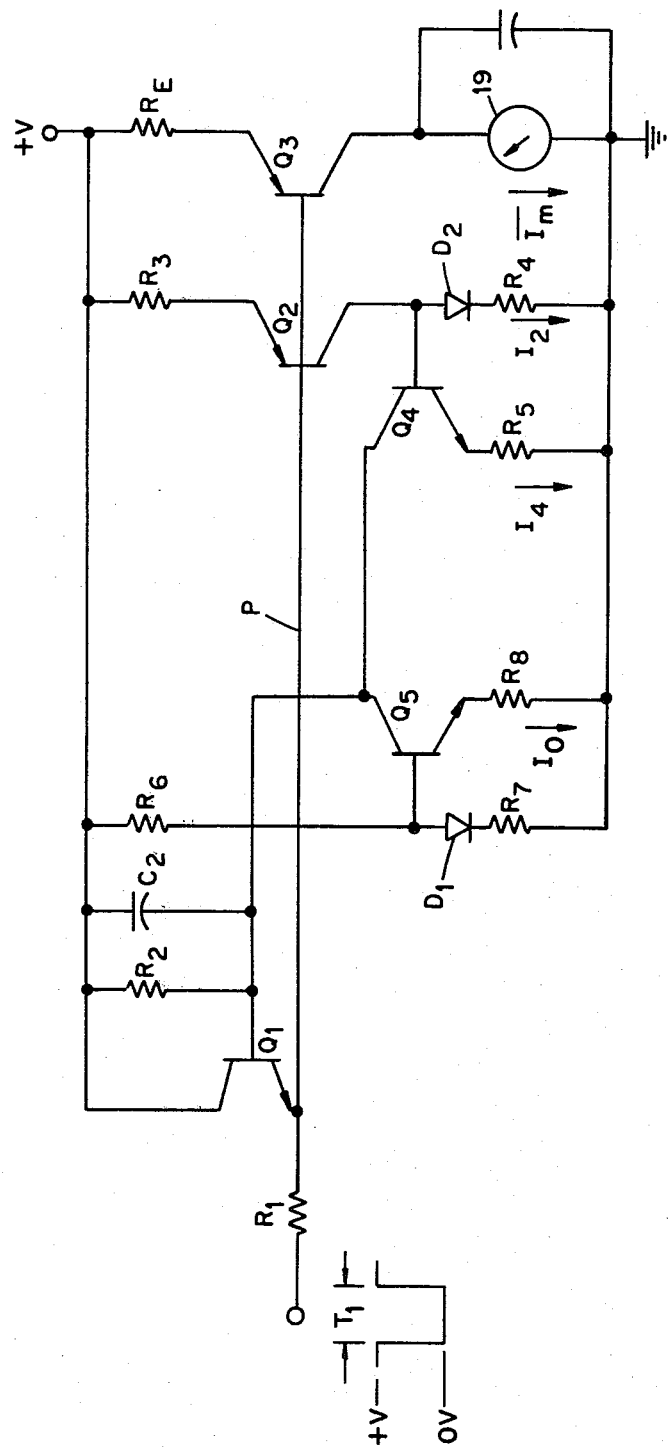
FIG. 3 is a circuit diagram of the compensation circuit shown in block form in FIG. 2.
Figure 4:
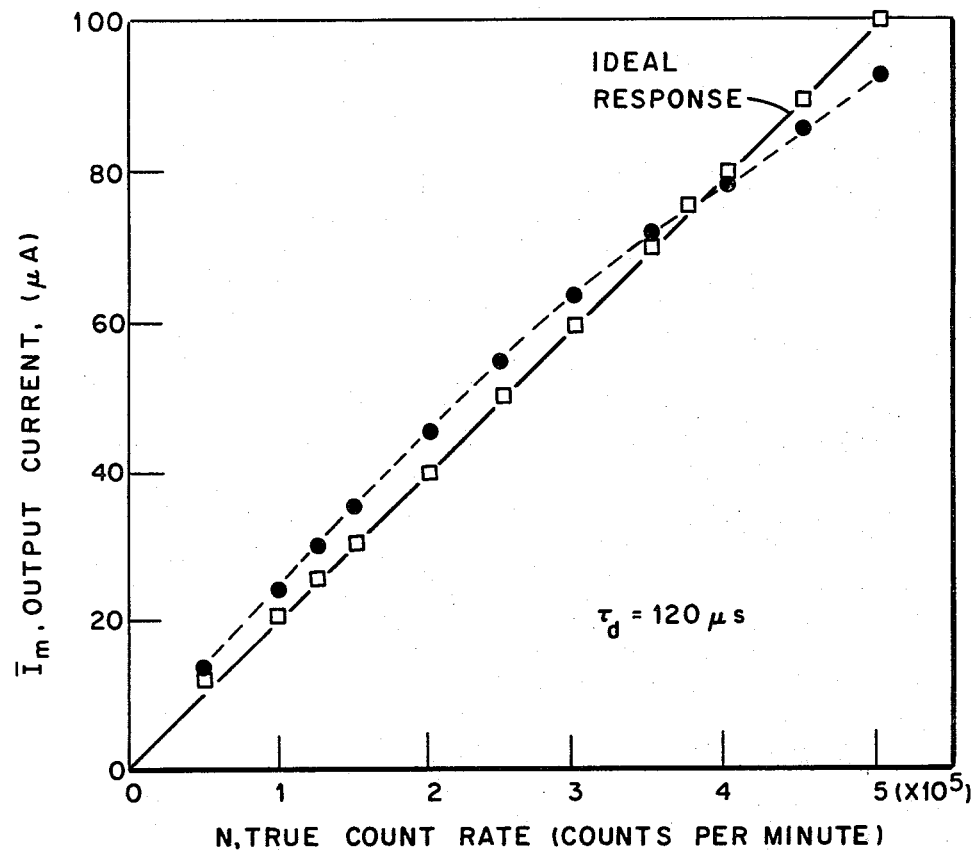
FIG. 4 is a graph of output meter current versus true count rate for a partially compensated circuit, shown by the dashed line, and an ideally compensated circuit shown by the solid line wherein the data from the compensation circuit of the present invention is shown by rectangular data points.

The circuit in which the function shown in FIG. 2 may be realized is shown schematically in FIG. 3. This circuit is based on the transfer function of equation (1) and will produce an output current $\overline{I_m}$ proportional to the actual count rate (N). In FIG. 3, $R_E$ and $Q_3$ compose the pulsed transistor current source that is common to most count-rate circuits connected in series with a current meter 19 which indicates the radiation dose rate. This is a circuit as shown in FIG. 1. The resistor $R_E$ provides the function $K_2$ wherein $K_2 = 1/R_E$. The gate circuit 15 of FIG. 2 is realized by the transistor $Q_1$ which has its emitter connected through a resistor $R_1$ to the input terminal of the circuit which is in turn connected to the output of the trigger circuit 13. The collector of $Q_1$ is connected to the supply voltage $+V$ and the base of $Q_1$ is connected to receive the reference voltage $V_R$. The reference voltage generator includes the resistor $R_2$ connected in series with a constant current source generator which generates a current $I_o$ flowing through resistor $R_2$. The constant current generator includes a transistor $Q_5$ with its base connected to the voltage divider formed by $R_6$, $D_1$ and $R_7$ connected between the $+V$ supply and ground. The emitter of $Q_5$ is connected through $R_8$ to ground. The base voltage applied to $Q_5$ is selected by the proper ratio of $R_6$ to $R_7$ and the value of $R_8$ is selected to generate the required constant current $I_o$. A capacitor $C_2$ is connected in shunt with resistor $R_2$ to provide the necessary integration function which prevents the voltage $V_R$ from changing significantly during the pulse period $T_1$.

The function $K_1$ is provided by transistors $Q_2$ and $Q_4$. The point P of FIG. 2 is represented by line P in FIG. 3 which is connected from the emitter of transistor $Q_1$ commonly to the base of transistors $Q_2$ and $Q_3$. The emitter of transistor $Q_2$ is connected through resistor $R_3$ to the $+V$ supply. The collector of $Q_2$ is connected to the base of $Q_4$ and through a diode $D_2$ and a resistor $R_4$ to ground. The emitter of $Q_4$ is connected through resistor $R_5$ to ground and the collector of $Q_4$ is connected to the collector of $Q_5$. The transistor $Q_4$, the diode $D_2$ and the resistors $R_4$ and $R_5$, constitute a current mirror circuit in that a current $I_2$ flowing through $R_4$ will induce a current $I_4$ to flow through $R_5$. The diode $D_2$ matches the voltage drop across the base to emitter of transistor $Q_4$ thereby maintaining the voltage across $R_4$ equal to the voltage across $R_5$. Therefore, since the voltage drop across these resistors is equal, the current $I_4$ is related to the current $I_2$ by the ratio of resistors $R_4/R_5$.

In operation during the period $T_1$ when the pulse from the trigger circuit is applied through $R_1$ to the emitter of $Q_1$, the reference voltage $V_R$ is gated onto the line P. The transistor $Q_3$ is turned on and the pulsed meter current flows through the meter 19. The reference voltage applied to line P also turns transistor $Q_2$ on for the same period generating the current $I_2$. $I_2$ is a pulsed current which increases as the repetition rate of the pulses from the detector is sensed and as the reference voltage rises, since the pulse on line P has a width $T_1$ and an amplitude equal to the reference voltage $V_R$. During the period the pulse is present, $Q_4$ also conducts a current $I_4$ which is proportional to $I_2$ as pointed out above. Thus, as the pulse rate to the input of the circuit increases, $I_4$ increases thereby increasing the current through $R_2$ and increasing the reference voltage $V_R$. Since the current $I_o$ is maintained constant, $V_R$ changes in direct proportion to the average current $\overline{I_4}$ times the resistor $R_2$.

Therefore it will be seen that the output current of this compensated count-rate circuit is given by $$\overline{I_m} = nT_1 \frac{V_R}{R_E}. \tag{5}$$

Assuming that the transistor base currents are negligible, it can be shown that $$V_R = I_o R_2 + \left( nT_1 \frac{V_R}{R_3} \frac{R_4}{R_5} \right) R_2; \tag{6}$$

therefore, solving equation (6) for $V_R$ and substituting into equation (5) yields $$\overline{I_m} = \frac{nT_1 I_o \frac{R_2}{R_E}}{1 - nT_1 \frac{R_2 R_4}{R_3 R_5}}. \tag{7}$$

Thus, from equation (7), by setting the positive feedback factor times the one-shot pulse width $[(R_2 R_4/R_3 R_5)T_1]$ equal to the detector dead time $t_d$ and by adjusting the forward current gain $(R_2/R_E)$, equation (1) can be exactly realized. Consequently, the meter current through the meter 19 is proportional to the actual count rate (N); it is not an approximation based on equation (2).

Bench tests of a prototype G-M survey meter have confirmed the theoretical results. The output current versus the actual count rate for the compensated count-rate circuit disclosed herein, plotted as indicated by the rectangular points in FIG. 3, shows that this circuit response is virtually identical to the ideal response. In addition, field tests using a radioactive source have shown the instrument response to vary linearly with increased count rate even at counting losses approaching 50%. A supply voltage for the count-rate circuit was provided by high efficiency DC to DC converter that was powered by two conventional $1\frac{1}{2}$ volt batteries. The low-power consumption and small number of components makes the circuit readily adaptable to monolithic construction which would not alter the size of a conventional survey meter. The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principals of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a radiation survey meter comprising an ionizing radiation detector which produces pulses at an output thereof dependent upon the radiation dose rate and having a counting loss due to a known detector dead time, a trigger circuit means for producing fixed-width pulses at an output thereof in response to each of said pulses from said detector and an indicating current meter for indicating the radiation dose rate in response to a pulsed meter current flowing therethrough, a count rate compensating circuit, comprising:

means for generating a reference voltage that is a function of the rate of said pulses from said trigger circuit;

meter current-generating means for generating said meter current proportional to the rate and amplitude of pulses applied to the input thereof; and gating means responsive to the pulse rate from said trigger circuit for gating said reference voltage to the input of said current-generating means for the duration of each of said fixed-width pulses from said trigger circuit means so that said metering current generated by said current-generating means is compensated for counting losses due to the known detector dead time and is thus directly proportional to the actual radiation dose rate.

2. The combination of claim 1 wherein said detector is a G-M tube wherein the actual radiation count per unit time (N) is related to the observed count per unit time (n) from said detector by the relationship $$N = \frac{n}{1 - nt_d},$$

where $t_d$ is the detector dead time and $nt_d$ is less than or equal to 1.

3. The combination of claim 2 wherein said reference voltage generating means includes a constant current generator, a first resistor connected in series with said constant current generator so that a predetermined minimum reference voltage, corresponding to a zero count rate is generated across said first resistor and a positive feedback circuit means responsive to the rate and amplitude of pulses applied to the input of said current generating means for altering said reference voltage as a function of the observed count rate (n) from said detector so that said meter current is compensated to indicate the true count rate (N) proportional to the radiation dose rate.

4. The combination of claim 3, wherein said gating means includes a transistor having a base electrode connected to receive said reference voltage from said reference voltage-generating means and an emitter electrode connected to the input of said current-generating means, and a second resistor connected between said emitter electrode and the output of said trigger circuit means.

5. The combination as set forth in claim 4 further including a capacitor connected in shunt with said first resistor and having a capacitance sufficient to prevent a change in said reference voltage for a period of time $T_1$, where $T_1$ is the width of said fixed-width pulses from said trigger circuit means.

6. The combination as set forth in claim 4 wherein said positive feedback circuit means includes a current mirror circuit having a first current-conducting circuit means through which a first pulsed current flows proportional to the amplitude of the pulses applied to the input of said meter current-generating means and a second current-conducting circuit means connected in series with said first resistor through which a second pulsed current flows proportional to said first pulsed current and in response thereto so that the current through said first resistor is altered to vary said reference voltage in response to the rate of pulses from said detector.

* * * * *